(12) United States Patent
McLaughlin et al.

(10) Patent No.: US 8,407,749 B2
(45) Date of Patent: Mar. 26, 2013

(54) COMMUNICATION SYSTEM AND METHOD

(75) Inventors: Mark McLaughlin, Woking (GB); Ben Dove, London (GB); Marek Laasik, Tallinn (EE); Madis Kaal, Tallinn (EE)

(73) Assignee: Skype, Dublin (IE)

( * ) Notice: Subject to any disclaimer, the term of this patent is extended or adjusted under 35 U.S.C. 154(b) by 219 days.

(21) Appl. No.: 12/584,463

(22) Filed: Sep. 4, 2009

(65) Prior Publication Data
US 2010/0064329 A1    Mar. 11, 2010

(30) Foreign Application Priority Data

Sep. 5, 2008   (GB) .................................. 0816276.0

(51) Int. Cl.
*H04N 7/173*   (2011.01)
*H04N 5/45*    (2011.01)
*H04N 5/91*    (2006.01)

(52) U.S. Cl. ............ 725/106; 725/43; 725/118; 725/135

(58) Field of Classification Search .......................... None
See application file for complete search history.

(56) References Cited

U.S. PATENT DOCUMENTS

| | | |
|---|---|---|
| 5,506,572 A | 4/1996 | Hills et al. |
| 5,587,928 A | 12/1996 | Jones et al. |
| 5,812,770 A | 9/1998 | Sakai |
| 5,856,821 A | 1/1999 | Funahashi |
| 5,923,737 A | 7/1999 | Weishut et al. |
| 6,061,434 A | 5/2000 | Corbett |
| 6,151,619 A | 11/2000 | Riddle |
| 6,209,025 B1 | 3/2001 | Bellamy |
| 6,243,129 B1 | 6/2001 | Deierling |
| 6,286,140 B1 | 9/2001 | Ivanyi |
| 6,628,964 B1 | 9/2003 | Bates et al. |
| 6,636,269 B1 | 10/2003 | Baldwin |
| 6,789,105 B2 | 9/2004 | Ludwig et al. |

(Continued)

FOREIGN PATENT DOCUMENTS

| | | |
|---|---|---|
| DE | 19971016486 A1 | 9/1998 |
| DE | 102006001607 | 8/2006 |

(Continued)

OTHER PUBLICATIONS

Search Report from Application No. GB0816276.0, Dated: Nov. 27, 2009.

(Continued)

*Primary Examiner* — Dominic D Saltarelli
*Assistant Examiner* — Oschta Montoya
(74) *Attorney, Agent, or Firm* — Wolfe-SBMC (57) ABSTRACT

A television receiver system and corresponding method, the television receiver system comprising: a television receiver for receiving broadcast television signals, signal processing apparatus operable to process the received television signals for output to a television screen, and a control device allowing a user to select a viewing activity by controlling the output to the television screen. The television receiver further comprises a memory storing a communication client application; and communications processing apparatus operable to execute the communication client application. The client application is programmed so as when executed to allow the user to establish bidirectional communications with one or more other users via a packet-based communication network, and to provide notifications to the user of incoming communication events from other users. The client application is further programmed to control the notifications of incoming communication events in dependence on the selection of viewing activity.

20 Claims, 3 Drawing Sheets

U.S. PATENT DOCUMENTS

| | | | |
|---|---|---|---|
| 6,930,661 B2 * | 8/2005 | Uchida et al. | 345/87 |
| 7,058,901 B1 | 6/2006 | Hafey et al. | |
| 7,099,693 B2 | 8/2006 | Shin | |
| 7,184,049 B2 | 2/2007 | Ballin et al. | |
| 7,454,711 B2 | 11/2008 | Angiulo et al. | |
| 7,573,988 B2 | 8/2009 | Lee et al. | |
| 7,587,684 B2 | 9/2009 | Perttula | |
| 7,954,124 B2 * | 5/2011 | Rambo | 725/43 |
| 7,966,039 B2 | 6/2011 | Sadovsky et al. | |
| 7,983,722 B2 | 7/2011 | Lowles et al. | |
| 2001/0005197 A1 | 6/2001 | Mishra et al. | |
| 2002/0109770 A1 | 8/2002 | Terada | |
| 2002/0144259 A1 | 10/2002 | Gutta et al. | |
| 2002/0199181 A1 | 12/2002 | Allen | |
| 2003/0009768 A1 | 1/2003 | Moir | |
| 2003/0036683 A1 | 2/2003 | Kehr et al. | |
| 2003/0052648 A1 | 3/2003 | Hara et al. | |
| 2003/0061033 A1 | 3/2003 | Dishert | |
| 2003/0070177 A1 | 4/2003 | Kondo et al. | |
| 2003/0070182 A1 * | 4/2003 | Pierre et al. | 725/135 |
| 2003/0097661 A1 | 5/2003 | Li et al. | |
| 2003/0105812 A1 | 6/2003 | Flowers et al. | |
| 2003/0117419 A1 | 6/2003 | Hermanson | |
| 2003/0142802 A1 | 7/2003 | Hong et al. | |
| 2004/0003025 A1 | 1/2004 | Hao | |
| 2004/0049624 A1 | 3/2004 | Salmonsen | |
| 2004/0060067 A1 | 3/2004 | Yi | |
| 2004/0128700 A1 | 7/2004 | Pan | |
| 2004/0135819 A1 | 7/2004 | Maa | |
| 2004/0163127 A1 | 8/2004 | Karaoguz et al. | |
| 2004/0176132 A1 | 9/2004 | Thrasher | |
| 2004/0207723 A1 | 10/2004 | Davis et al. | |
| 2004/0214541 A1 | 10/2004 | Choi | |
| 2004/0258059 A1 | 12/2004 | Frank et al. | |
| 2005/0071686 A1 | 3/2005 | Bagga et al. | |
| 2005/0146598 A1 | 7/2005 | AbiEzzi et al. | |
| 2005/0165922 A1 | 7/2005 | Hatano | |
| 2005/0190700 A1 | 9/2005 | Melpignano | |
| 2005/0249196 A1 | 11/2005 | Ansari et al. | |
| 2005/0286711 A1 | 12/2005 | Lee et al. | |
| 2005/0289480 A1 | 12/2005 | Mathews et al. | |
| 2006/0040638 A1 | 2/2006 | McQuaide, Jr. | |
| 2006/0080713 A1 * | 4/2006 | Fujibayashi et al. | 725/78 |
| 2006/0095754 A1 | 5/2006 | Hyder et al. | |
| 2006/0109268 A1 | 5/2006 | Napoli et al. | |
| 2006/0181548 A1 | 8/2006 | Hafey et al. | |
| 2006/0190443 A1 | 8/2006 | Mathews et al. | |
| 2007/0039025 A1 | 2/2007 | Kraft et al. | |
| 2007/0115346 A1 | 5/2007 | Kim et al. | |
| 2007/0118866 A1 | 5/2007 | Chen | |
| 2007/0139514 A1 | 6/2007 | Marley | |
| 2007/0147367 A1 | 6/2007 | Hwang et al. | |
| 2007/0156686 A1 | 7/2007 | Kim et al. | |
| 2007/0214482 A1 * | 9/2007 | Nguyen | 725/91 |
| 2007/0216759 A1 | 9/2007 | Gonen et al. | |
| 2007/0275766 A1 | 11/2007 | Kim et al. | |
| 2007/0279482 A1 | 12/2007 | Oswald et al. | |
| 2008/0031169 A1 | 2/2008 | Shi et al. | |
| 2008/0034325 A1 | 2/2008 | Ording | |
| 2008/0062249 A1 | 3/2008 | Nagase et al. | |
| 2008/0066131 A1 | 3/2008 | Chang et al. | |
| 2008/0150892 A1 | 6/2008 | Duhig et al. | |
| 2008/0152110 A1 | 6/2008 | Underwood et al. | |
| 2008/0186410 A1 | 8/2008 | Hardacker et al. | |
| 2009/0036159 A1 | 2/2009 | Chen | |
| 2009/0167839 A1 | 7/2009 | Ottmar | |
| 2009/0320073 A1 * | 12/2009 | Reisman | 725/51 |
| 2010/0005497 A1 | 1/2010 | Maresca | |
| 2010/0058408 A1 | 3/2010 | LaFreniere et al. | |
| 2010/0060477 A1 | 3/2010 | Laasik et al. | |
| 2010/0060715 A1 | 3/2010 | Laasik et al. | |
| 2010/0060716 A1 | 3/2010 | Kert | |
| 2010/0060788 A1 | 3/2010 | Blackburn et al. | |
| 2010/0064328 A1 | 3/2010 | Laasik et al. | |
| 2010/0064329 A1 | 3/2010 | McLaughlin et al. | |
| 2010/0064333 A1 | 3/2010 | Blackburn et al. | |
| 2010/0064334 A1 | 3/2010 | Blackburn et al. | |
| 2011/0043599 A1 | 2/2011 | Luo et al. | |
| 2011/0173672 A1 * | 7/2011 | Angiolillo et al. | 725/118 |

FOREIGN PATENT DOCUMENTS

| | | |
|---|---|---|
| EP | 0741484 A2 | 11/1996 |
| EP | 0 919 906 A2 | 11/1998 |
| EP | 1331762 | 7/2003 |
| EP | 1372333 A2 | 12/2003 |
| EP | 1622378 A1 | 2/2006 |
| EP | 1761048 A2 | 3/2007 |
| EP | 1853013 | 11/2007 |
| EP | 1860852 A1 | 11/2007 |
| EP | 1912175 A1 | 4/2008 |
| EP | 1940156 A2 | 7/2008 |
| EP | 2110796 A2 | 10/2009 |
| EP | 2353296 | 8/2011 |
| GB | 2410868 A | 8/2005 |
| GB | 2463108 | 3/2010 |
| GB | 2463110 | 3/2010 |
| GB | 2463124 | 3/2010 |
| GB | 2463108 | 8/2012 |
| JP | 2001169368 | 6/2001 |
| JP | 2004080289 | 3/2004 |
| JP | 2004312320 | 11/2004 |
| JP | 2007067979 A | 8/2005 |
| JP | 2008182463 | 8/2008 |
| WO | WO 98/51079 A1 | 11/1998 |
| WO | WO 01/30070 A1 | 4/2001 |
| WO | WO 01/47210 A2 | 6/2001 |
| WO | WO 01/67315 A1 | 9/2001 |
| WO | WO 02/30105 A1 | 4/2002 |
| WO | WO 02/30116 A1 | 4/2002 |
| WO | WO 02/082343 A1 | 10/2002 |
| WO | WO-02082343 | 10/2002 |
| WO | WO 03/021960 | 3/2003 |
| WO | WO 03/028373 A1 | 4/2003 |
| WO | WO 2005/009019 A2 | 1/2005 |
| WO | WO 2005/025194 A1 | 3/2005 |
| WO | WO 2007/098155 A2 | 8/2007 |
| WO | WO 2007/113580 A1 | 10/2007 |
| WO | WO 2007/127788 A2 | 11/2007 |
| WO | WO 2008/030711 A2 | 3/2008 |
| WO | WO 2009/094291 A1 | 7/2009 |
| WO | WO-2010026185 | 3/2010 |
| WO | WO-2010026187 | 3/2010 |
| WO | WO-2010026190 | 3/2010 |
| WO | WO-2010026191 | 3/2010 |

OTHER PUBLICATIONS

International Search Report from Application No. PCT/EP2009/061406, Dated: Dec. 4, 2009.

Written Opinion of the International Searching Authority from Application No. PCT/EP2009/061406, Dated: Dec. 4, 2009.

"Advisory Action", U.S. Appl. No. 12/455,084, (Mar. 21, 2012), 3 pages.

"Advisory Action", U.S. Appl. No. 12/455,210, (Jun. 5, 2012), 2 pages.

"Advisory Action", U.S. Appl. No. 12/455,653, (Nov. 21, 2011), 3 pages.

"Final Office Action", U.S. Appl. No. 12/455,084, (Jan. 17, 2012), 16 pages.

"Final Office Action", U.S. Appl. No. 12/455,210, (Mar. 19, 2012), 14 pages.

"Final Office Action", U.S. Appl. No. 12/455,652, (May 16, 2012), 30 pages.

"Final Office Action", U.S. Appl. No. 12/455,653, (Sep. 14, 2011), 30 pages.

"International Search Report and Written Opinion", Application No. PCT/EP2009/061413, (Apr. 12, 2009), 13 pages.

"International Search Report and Written Opinion", Application No. PCT/EP2009/061418, (Apr. 12, 2009), 13 pages.

"International Search Report and Written Opinion", Application No. PCT/EP2009/061410, (Oct. 20, 2009), 14 pages.

"International Search Report and Written Opinion", International Application No. PCT/EP2009/061409, (Oct. 20, 2009), 15 pages.

"International Search Report and Written Opinion", International Application No. PCT/EP2009/061411, (Nov. 26, 2009), 20 pages.
"International Search Report and Written Opinion", International Application No. PCT/EP2009/061416, (Oct. 21, 2009), 13 pages.
"Non Final Office Action", U.S. Appl. No. 12/455,653, (Mar. 23, 2011), 22 pages.
"Non-Final Office Action", U.S. Appl. No. 12/455,084, (May 23, 2011), 14 pages.
"Non-Final Office Action", U.S. Appl. No. 12/455,085, (Mar. 15, 2012), 6 pages.
"Non-Final Office Action", U.S. Appl. No. 12/455,210, (Sep. 29, 2011), 14 pages.
"Non-Final Office Action", U.S. Appl. No. 12/455,652, (Jan. 26, 2012), 28 pages.
"Search Report under Section 17", Application No. GB0816271.1, (Nov. 24, 2009), 2 pages.
"Search Report under Section 17", Application No. GB0816275.2, (Nov. 23, 2009), 1 page.
"Search Report under Section 17", Application No. GB0816279.4, (Nov. 26, 2009), 2 pages.
"Search Report", Application No. GB0816280.2, (Dec. 3, 2009), 1 page.
"Search Report", Application No. GB0816281.0, (Nov. 20, 2009), 2 pages.
"Advisory Action", U.S. Appl. No. 12/455,652, (Aug. 30, 2012), 3 pages.
"Final Office Action", U.S. Appl. No. 12/455,085, (Aug. 16, 2012), 7 pages.
"Foreign Office Action", Great Britain Application No. 0907818.9, (Mar. 14, 2012), 4 pages.
"Foreign Office Action", Great Britain Application No. 0816279.4, (Mar. 8, 2012), 5 pages.
"International Search Report", GB Application 0907818.9, (Aug. 24, 2009), 1 pages.
"Non-Final Office Action", U.S. Appl. No. 12/455,084, (Aug. 30, 2012), 29 pages.
"Non-Final Office Action", U.S. Appl. No. 12/455,635, (Aug. 22, 2012), 20 pages.
"Non-Final Office Action", U.S. Appl. No. 12/455,653, (Oct. 23, 2012), 28 pages.
"Non-Final Office Action", U.S. Appl. No. 12/583,007, (Aug. 8, 2012), 6 pages.
"Notice of Allowance", U.S. Appl. No. 12/455,210, (Oct. 10, 2012), 4 pages.
"Search Report and Written Opinion", PCT Application PCT/EP2009/061398, (Oct. 20, 2009), 15 pages.
"Search Report", Application No. GB0816278.6, (Dec. 2, 2009), 2 pages.
"Corrected Notice of Allowance", U.S. Appl. No. 12/455,210, (Dec. 5, 2012), 2 pages.
"Final Office Action", U.S. Appl. No. 12/455,635, (Dec. 31, 2012), 25 pages.
"Notice of Allowance", U.S. Appl. No. 12/583,007, (Nov. 29, 2012), 4 pages.

* cited by examiner

COMMUNICATION SYSTEM AND METHOD

RELATED APPLICATIONS

This application claims priority under 35 U.S.C. §119 or 365 to UK Application No. 0816276.0, filed 5 Sep. 2008. The entire teachings of the above application are incorporated herein by reference.

FIELD OF THE INVENTION

The present invention relates to facilitating communications over a communication network.

BACKGROUND

Packet-based communication systems allow the user of a device, such as a personal computer, to communicate across a computer network such as the Internet. Packet-based communication systems include voice over internet protocol ("VoIP") communication systems. These systems are beneficial to the user as they are often of significantly lower cost than fixed line or mobile networks. This may particularly be the case for long-distance communication. To use a VoIP system, the user must install and execute client software on their device. The client software provides the VoIP connections as well as other functions such as registration and authentication. In addition to voice communication, the client may also provide further features such as video calling, instant messaging ("IM"), SMS messaging, and voicemail.

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

A problem with packet-based communication networks is that the accessibility of packet-based communications to users is limited. In particular, such communications are most commonly accessed using a personal computer. This has the disadvantage that the user must be sufficiently technically competent to download and install the packet-based communication client software on their personal computer, which provides a barrier to the take-up of the packet-based communication service. Even when the communication client is installed and executed on a personal computer, the use of the packet-based communication system may be limited because personal computers are often not located in a place where the user is either familiar or comfortable with communicating. For example, a personal computer is often located in a study which for many users is not the most natural or comfortable environment for making phone calls.

Whilst packet-based communication systems can also be accessed via certain mobile devices, these generally do not have processing resources or display screens available to offer a full range of features, such as video calling.

It would therefore be desirable to make packet-based communications more accessible to users.

SUMMARY

One way to make packet-based communications more accessible to users would be to run a packet-based communication client on a processor embedded in a familiar household media appliance like a television set or a set-top box for plugging into a television.

However, a problem with this would be that the operation of the client would interfere with the user's viewing. Particularly, when the client notifies the user of an incoming call or other communication event, e.g. by ringing or flashing up a message on screen, then this would interfere with the user's viewing if they were watching a television program, video disc or such like at the time.

It would be advantageous to overcome this problem in order to be able incorporate a bidirectional, packet-based communications client into a television receiver system in an accessible and user-friendly manner.

According to one aspect of the present invention there is provided a television receiver system comprising: a television receiver operable to receive broadcast television signals; signal processing apparatus, coupled to the television receiver, operable to process signals including at least said received television signals for output to a television screen; a control device communicable with the signal processing apparatus, configured to allow a user to select a viewing activity by controlling the output to the television screen; a memory storing a communication client application; and communications processing apparatus, coupled to said memory, operable to execute the communication client application; wherein the client application is programmed so as when executed to allow the user to establish bidirectional communications with one or more other users via a packet-based communication network, and to provide notifications to the user of incoming communication events from other users; and wherein the client application is further programmed to control said notifications of incoming communication events in dependence on said selection of viewing activity.

For example, in embodiments the television receiver may be operable to receive multiplexed broadcast television signals corresponding to a plurality of respective concurrent programs, the signal processing apparatus may comprise a demultiplexer operable to separate out the signal of a required one of the programs for output to the television screen, the control device may be configured to allow the user to select said viewing activity by selecting the program required for output to the television screen, and the client application may be programmed to control said notifications in dependence on the selected program.

The television receiver may be operable to receive a transport stream comprising packets of a plurality of time-division multiplexed broadcast signals corresponding to a plurality of respective concurrent programs, and the demultiplexer may comprise a packet filter operable to extract the packets of the required program.

The television receiver may be operable to receive frequency-division multiplexed broadcast signals, and the demultiplexer may comprise a tuner circuit operable to tune to the frequency of the required program.

The signal processing apparatus may be operable to process an alternative video signal from a source other than television broadcast, the control device may be configured to allow the user to select said viewing activity by selecting between a received television signal and the alternative video signal for output to the television screen, and the client application may be programmed to control said notifications in dependence on whether the alternative video signal is selected.

Said other source may be video disc player, the control device may be configured to allow the user to select said viewing activity by selecting between television and video disc, and the client application may be programmed to control said notifications in dependence on whether video disc is selected.

The control device may be configured to allow the user to select said viewing activity by selecting between an active viewing state in which signals are output to the television screen and an inactive viewing state in which signals are not output to the television screen, and the client application may be programmed to control notifications in dependence on whether the active or inactive viewing state has been selected.

The client application may be programmed to refer to an electronic program guide comprising a digital schedule of programs including a record of whether programs have been flagged by a user, and to control said notifications in dependence on whether the selected program is flagged.

The client application may be programmed to control the notifications by suppressing notifications in dependence on the selected viewing activity.

The client application may be programmed to control the notifications by changing output device for the notification in dependence on the selected viewing activity.

The client application may be programmed to control the notifications by changing the appearance of visible notifications on said television screen in dependence on the selected viewing activity.

The client application may be programmed to change the appearance of said visible notifications by altering their transparency.

The television receiver may comprise one of a satellite television receiver operable to receive wireless broadcasts from a satellite repeater station, a terrestrial television receiver operable to receive wireless broadcasts from a terrestrial repeater station, and a cable television receiver operable to receive cable broadcasts.

The client application may be further programmed to change a presence status of the user in dependence on said selection of viewing activity.

The bidirectional communication may comprise at least one of a video call, an audio phone call, and a text chat conversation.

Said communication network may comprise the Internet.

The client application may be programmed to allow the user to establish said bidirectional communications via a peer-to-peer connection in said communication network.

According to another aspect of the present invention, there is provided a method comprising: receiving a broadcast television signal; processing said received television signals for output to a television screen; selecting a viewing activity by controlling the output to the television screen; executing a communication client application to establish bidirectional communications with one or more other users via a packet-based communication network, and to provide notifications to the user of incoming communication events from other users; and controlling said notifications of incoming communication events in dependence on said selection of viewing activity.

According to another aspect of the present invention, there is provided a television set comprising: a television receiver operable to receive broadcast television signals; a television screen; signal processing apparatus, coupled to the television receiver and screen, operable to process signals including at least said received television signals for output to the television screen; a control device communicable with the signal processing apparatus, configured to allow a user to select a viewing activity by controlling the output to the television screen; a memory storing a communication client application; and communications processing apparatus, coupled to said memory, operable to execute the communication client application; wherein the client application is programmed so as when executed to allow the user to establish bidirectional communications with one or more other users via a packet-based communication network, and to provide notifications to the user of incoming communication events from other users; and wherein the client application is further programmed to control said notifications of incoming communication events in dependence on said selection of viewing activity.

According to another aspect of the present invention, there is provided a set-top box for connection to a television set, the set-top box comprising: a television receiver operable to receive broadcast television signals; signal processing apparatus, coupled to the television receiver, operable to process signals including at least said received television signals for output to a television screen; a control device communicable with the signal processing apparatus, configured to allow a user to select a viewing activity by controlling the output to the television screen; a memory storing a communication client application; and communications processing apparatus, coupled to said memory, operable to execute the communication client application; wherein the client application is programmed so as when executed to allow the user to establish bidirectional communications with one or more other users via a packet-based communication network, and to provide notifications to the user of incoming communication events from other users; and wherein the client application is further programmed to control said notifications of incoming communication events in dependence on said selection of viewing activity.

According to another aspect of the present invention, there is provided a client application product comprising code which when executed on a processor will perform the steps of the methods described above.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

In order to overcome the above-mentioned problems with packet-based communication networks, a system has been developed to enable a user to access such networks from a television ("TV"). This is achieved either by embedding the communication client into the TV itself, or through a separate set-top box ("STB") television receiver connected to the TV.

This is advantageous because the TV can be provided with all the embedded hardware and software required to access the packet-based communication system built-in. Alternatively, this can be embedded into a STB which is readily connected to an existing TV using known interfaces (such as SCART or HDMI, for example). This eliminates the need for the user to download and install software on their personal computer, and provides a simpler method by which non-technical users can access the packet-based communication system in their home. In addition, the TV is typically located in a living room of a house, which enables the packet-based communication system to be accessed from the location in the house which is most familiar to many users for communicating with friends and relatives.

The embedding of a packet-based communication client in a TV also has the advantage that a large screen is present, which can be utilised for video calling. Furthermore, significant processing power can be provided in the TV, particularly as the power requirements for a large, mains electricity powered consumer electronics device are less stringent than, for example mobile devices. This enables a full range of features to be included in the embedded communication client, such as high quality voice and video encoding.

However, to make such an arrangement agreeable to users, it is necessary to prevent notifications of incoming calls or other communication events from interfering with a user's viewing, e.g. by ringing loudly or displaying obtrusive on-screen messages in the middle of the user's favourite program. Therefore the client is arranged to detect the viewing activity of the user and to control communication notifications in dependence on the detected viewing activity.

Figure 1:
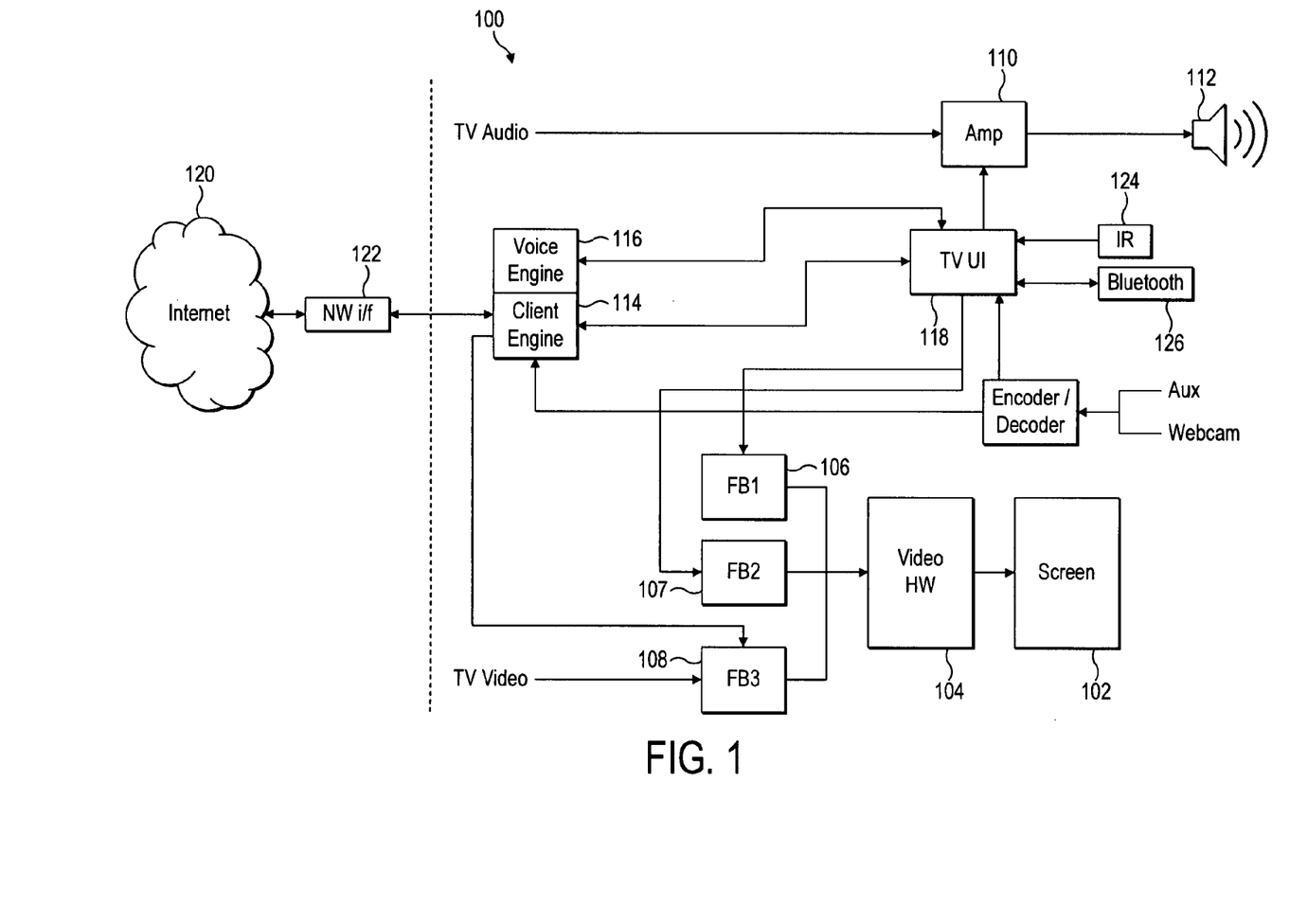
FIG. 1 is a block diagram showing the functional blocks of a TV with an embedded communication client.

Reference is now made to FIG. 1, which illustrates the hardware and software functional blocks embedded in a TV 100. The TV 100 comprises a screen 102 for displaying images to the user, which is driven by video driver hardware 104 arranged to convert the video signals into the form required to be correctly displayed on the screen 102. The video driver hardware 104 is provided with digital video data from two frame buffers 106 and 108. The frame buffers 106 and 108 are storage devices that buffer video data that is to be displayed to the user. Frame buffer 3 ("FB3") 108 receives standard TV video signals, as is known for the display of broadcast TV. Frame buffer 1 ("FB1") 106 stores video data related to the packet-based communication client, as will be described presently. An audio amplifier 110 receives TV audio signals and amplifies these for output through at least one speaker 112.

The TV audio and video input signals themselves originate from television signals broadcast via any suitable means such as a satellite repeater stations, wireless terrestrial repeater stations or cable; and are received by a television receiver unit of the TV 100 (not shown). Note that broadcasting is distinct from point-to-point communication, including being distinct from multicasting (i.e. point-to-multipoint). In broadcasting, signals are transmitted indiscriminately, i.e. regardless of whether the user has selected to receive the signal (although a decryption key or such like may still be required so that only authorised users can access the broadcast); whereas in point-to-point communication, signals must be requested by the user or users receiving them. Or put another way, to receive a broadcast a user simply "tunes in" without needing to send any signal to the broadcaster, whereas to establish a point-to-point connection then signals must be exchanged between the user and broadcaster.

The TV receiver unit may comprise for example an antenna, satellite dish or cable input; sampling circuitry; a filter; a low noise amplifier; a mixer, and/or an analogue to digital converter.

After being received by the receiver unit, the signals are then processed by a signal processing apparatus (also not shown) before being input to the frame buffers and amplifier of FIG. 1. The signal processing may comprise for example a digital filter, demultiplexer, decoder, decryption block, and/or error checking block; which may be implemented in on-chip hardware in the form of one or more on-chip peripherals, off-chip hardware in the form of one or more off-chip units accessed via one or more I/O peripherals, or in software stored in a memory and executed on a central processing unit (CPU) of the television 100, or in any combination of these.

In the case of traditional analogue television broadcasts, the signals of a plurality of different concurrent programs (of different TV channels) are frequency-division multiplexed over the airwaves by being transmitted on different frequencies. The receiving TV then requires a tuning circuit to demultiplex the broadcasts to separate out signal of the required program. In the case of digital television broadcasts, the signals of different concurrent programs are each divided into packets and interleaved so as to time-division multiplex the different program's signals into a transport stream for broadcast. The receiving TV then requires a packet filter to demultiplex the packets and so separate out the signal of the required program.

The packet-based communication client embedded in the TV 100 is based around three main elements. Preferably, these three elements are software elements that are stored in memory and executed on a CPU embedded in the TV 100. The three elements are: a client engine 114; a voice engine 116; and a TV user interface (UI) 118. The element 116 may also include a video engine if the client supports video calls. In addition to these elements, an electronic program guide (EPG) may also be implemented in software, providing a schedule of television programs.

The client engine 114 and voice engine 116 establish and conduct bidirectional, packet-based, point-to-point (including the possibility of point-to-multipoint) communications via a packet based communication network such as the Internet; e.g. by establishing a peer-to-peer connection over a peer-to-peer network implemented over the Internet 120.

The client engine 114 is responsible for setting up connections to the packet-based communication system. This is performed via a connection from the TV 100 to the internet 120. The TV 100 is connected to the internet 120 via a network interface 122 such as a modem, and the connection between the TV 100 and the network interface 122 may be via a wired connection or a wireless connection. The client engine 114 performs call set-up, authentication, encryption and connection management, as well as other functions relating to the packet-based communication system such as firewall traversal, presence state updating, and contact list management.

The voice engine 116 is responsible for encoding of voice signals input to the TV 100 as VoIP packet for transmission over the internet 120 and the decoding of VoIP packets received from the internet 120 for presentation as audio information to the user of the TV 100. The TV user interface ("UI") 118 is responsible for presenting visual information to the user of the TV 100 in the form of a graphical user interface displayed on the TV screen 102.

The client engine 114 is connected to the TV UI 118 in order to control what the UI displays to the user. The client engine 114 is also closely integrated with the voice engine 116 for the efficient transmission and receiving of voice packets over the internet.

The voice engine 116 is connected to the TV UI 118 as voice signals from the user are passed through the TV UI 118 to the voice engine 116, and vice versa.

The TV UI 118 is connected to a frame buffer 1 ("FB1") 106, so that the graphical user interface data is buffered and ultimately displayed to the user on the screen 102. The TV UI 118 is also connected to another frame buffer 2 ("FB2") 107 for providing user interface control information relating to the appearance of the UI on the screen 102, such as the degree of transparency of the user interface, i.e. how "see through" it is (though using a separate frame buffer FB2 is not the only possible method for this, and instead transparency may be created by including the relevant information in the main frame buffer FB1). The TV UI 118 is also connected to the amplifier 110, enabling sound (such as voice signals or notifications) to be produced from the TV speakers 112. The TV UI 118 is also connected to an infra-red ("IR") receiver 124 and a bluetooth transceiver 126 which are used for communicating with a remote control unit, as will be discussed below Known TVs are not designed to accommodate any form of bi-directional communications. A system is therefore required for enabling user interaction with the TV for making and receiving calls and messages which is intuitive for users. To achieve this, the remote control of the TV is enhanced to provide functionality which enables the user to make and receive calls, as well as send and receive messages using the TV.

Figure 2:
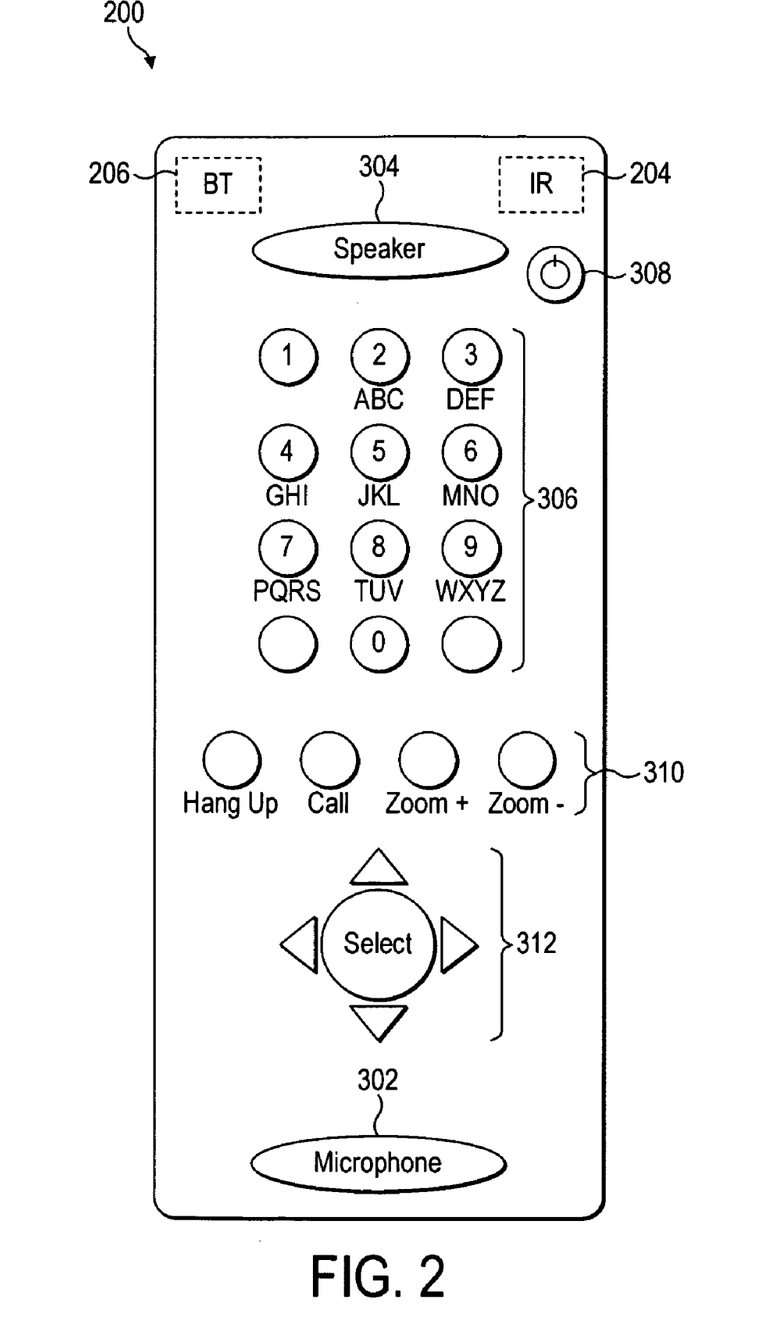
FIG. 2 shows a remote control of a remote control unit for use with the TV of FIG. 1.

Reference is now made to FIG. 2, which illustrates the physical layout of a remote control unit 200 for use with the TV 100. The remote control unit 200 resembles conventional remote controls for TVs. However, the remote control unit 200 includes an integrated microphone 302, and, optionally an integrated speaker 304. This enables the remote control unit 200 to be held to the head of the user in a similar manner to a conventional telephone, or in front of the user if it does not have its own speaker inside. Integrated within the unit are an IR transmitter 204 and Bluetooth transceiver 206. The IR transmitter 204 sends IR signals to the IR receiver 124 in the TV 100, allowing the user to change channels, turn the television on or off, or select alternative auxiliary inputs such as in input from a DVD player or other video disc system. This is performed in a similar manner to conventional remote control units used with televisions. Bluetooth transceiver 206 which is able to communicate with the Bluetooth transceiver 126 located in the TV 100. The Bluetooth transceiver 206 is paired with the Bluetooth transceiver 126 located in the TV 100 such that a data connection can be readily formed between them. The data connection enables the transmission of data from the remote control unit 200 to the TV 100, and, optionally, the reception of data from the TV 100 at the remote control unit 200.

This allows audio data to be communicated with the client and voice engine 114 and 116 for use in the bidirectional, packet-based voice communications with other users over the Internet 120.

The remote control unit 200 further comprises a keypad 306, which is used for conventional TV control purposes, and also for entering information for the embedded packet-based communication client. The keypad 306 comprises numbered keys that can also be used to enter alphabetic characters. A standby button 308 is used for placing the TV 100 into standby mode. Dedicated function keys 310 are used to control the operation of the packet-based communication client, and a directional pad 312 is used for navigating the TV user interface.

Figure 3:
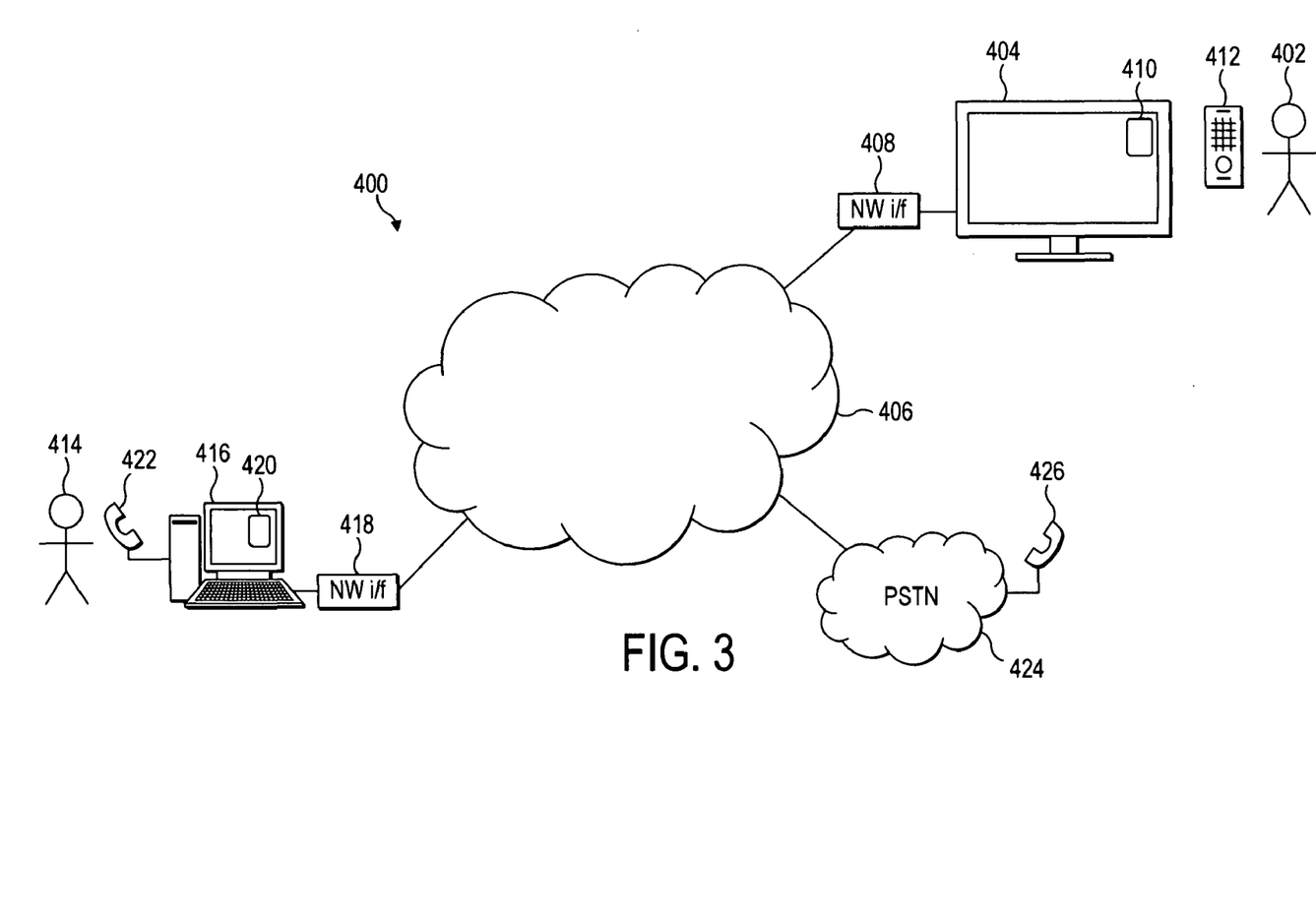
FIG. 3 shows an illustrative packet-based communication system.

In order to describe the operation of the TV 100 and enhanced remote control unit 200 with the packet based communication system, reference is now made to FIG. 3, which illustrates the use of the TV 100 in a portion of an example system 400.

Note that whilst the illustrative embodiment shown in FIG. 3 is described with reference to a P2P communication system, other types of communication system could also be used, such as non-P2P, VoIP or IM systems. The system 400 shown in FIG. 3 shows a first user 402 of the communication system operating a TV 404 (similar to the TV 100 of FIG. 1) which is shown connected to a network 406. Note that the communication system 400 utilises a network such as the Internet. The TV 404 is connected to the network 406 via a network interface 408 such as a modem, and the connection between the user terminal 104 and the network interface 108 may be via a cable (wired) connection or a wireless connection. The TV 404 shown in FIG. 3 is a standalone unit, but it should be appreciated that a separate TV and STB can also be used.

The TV 404 is executing an embedded communication client 410. Note that in alternative embodiments, the embedded communication client can be executed in a set top box. The embedded communication client 410 comprises software stored in a memory and executed on a local processor in the TV 404.

The TV 404 is arranged to receive information from and output information to the user 402. A remote control unit 412 acts as the input device operated by the user 402 for the control of the TV 404. The remote control 412 comprises a speaker and microphone to enable the user to listen and speak in a voice call. The remote control unit 412 communicates wirelessly with the TV 404, as described previously.

The TV 404 can also receive broadcast television signals, and display these as video (television programmes) to the user on the TV screen. The broadcast television signals can be delivered by terrestrial, satellite or cable broadcasting, and be in the form of analogue signals or digital data. The user 402 can control the display of the television signals (e.g. which channels to display) using the remote control unit 412. The TV 404 can also receive one or more audio-video inputs from alternative sources such as from a DVD player or other video disc system, which again can be selected by the user 402 using the remote control unit 412.

The embedded communication client is arranged to establish and manage calls made over the packet-based communication system using the network 406. The embedded communication client 410 is also arranged to present information to the user 402 on the screen of the TV 404 in the form of a user interface. The user interface comprises a list of contacts associated with the user 402. Each contact in the contact list has a presence status associated with it, and each of these contacts have authorised the user 402 of the client 410 to view their contact details and presence state. The presence state tells other authorised users (e.g. 414) of the packet-based communication network 400 about the availability of the user 402.

The contact list for the users of the packet-based communication system is stored in a contact server (not shown in FIG. 3). When the client 410 first logs into the communication system the contact server is contacted, and the contact list is downloaded to the client 410. This allows the user to log into the communication system from any terminal and still access the same contact list. The contact server is also used to store a mood message (a short user-defined text-based status that is shared with all users in the contact list) and a picture selected to represent the user (known as an avatar). This information can be downloaded to the client 410, and allows this information to be consistent for the user when logging on from different terminals. The client 410 also periodically communicates with the contact server in order to obtain any changes to the information on the contacts in the contact list, or to update the stored contact list with any new contacts that have been added.

Also connected to the network 406 is a second user 414. In the illustrative example shown in FIG. 3, the user 404 is operating a user terminal 416 in the form of a personal computer. Note that in alternative embodiments, other types of user terminal can also be connected to the packet-based communication system. In addition to personal computers ("PC") (including, for example, Windows™, Mac OS™ and Linux™ PCs), a personal digital assistant ("PDA"), a mobile phone, or a gaming device could also be connected. In a preferred embodiment of the invention the user terminal 416 comprises a display such as a screen and an input device such as a keyboard, mouse, joystick and/or touch-screen. The user device 416 is connected to the network 406 via a network interface 418 such as a modem.

Note that in alternative embodiments, the user terminal 416 can connect to the communication network 406 via additional intermediate networks not shown in FIG. 1. For example, if the user terminal 416 is a mobile device, then it can connect to the communication network 406 via a mobile network (for example a GSM or UMTS network).

The user terminal 416 is running a communication client 420, provided by the software provider. The communication client 420 is a software program executed on a local processor in the user terminal 416 comprising similar elements to the embedded communication client 410. The communication client 420 enables the user terminal 416 to connect to the packet-based communication system. The user terminal 416 is also connected to a handset 422, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 416, or integrated into the user terminal 416 itself.

Presuming that the first user 402 is listed in the contact list of the client 420 presented to second user 414, then the second user 414 can initiate a call to the first user 402 over the communication system by selecting the contact and clicking on a "call" button using a pointing device such as a mouse. The call set-up is performed using proprietary protocols, and the route over the network 406 between the calling user and called user is determined by the peer-to-peer system without the use of servers.

Following authentication through the presentation of digital certificates (to prove that the users are genuine subscribers of the communication system—described in more detail in WO 2005/009019), the call can be established.

Referring again to FIGS. 1 and 2, when the incoming call is received at the client engine 114 the TV UI 118 is notified of the incoming call. This places the TV UI 118 into an incoming call state, such that key presses from remote are interpreted accordingly. The TV UI 118 may output graphics to the FB1 106 to display a notification of the incoming call on the TV screen 102, such that the user 402 is aware of the incoming call. Alternatively or additionally, the TV UI 118 may generate a ringing sound or other audible signal to notify the user of the incoming call. The notification may only be active for a predetermined time, after which time the notification will fade and the incoming call state will be deactivated.

The user 402 can select to answer the incoming call by pressing a key on the remote control unit 412 or enacting a physical motion such as sliding out a movable microphone unit. In response to the user 402 selecting to answer the incoming call the remote control unit 200 transmits a command to the TV 100 using the IR transmitter 204. This command indicates that the user has selected to accept the call (either by pressing a button or performing an action). The remote control unit 200 then activates the Bluetooth transceiver 206. The Bluetooth transceiver 206 is not activated until it is needed to save battery power consumption. The Bluetooth transceiver 206 establishes a connection with the Bluetooth transceiver 126 in the TV 100. The microphone circuitry is enabled to receive audio inputs.

When the TV UI 118 receives the command transmitted via the IR transmitter 204 at the IR receiver 124, this is interpreted this as a call accept command, since the TV UI 118 is in the incoming call state. Note that in alternative embodiments, the IR sent from the remote 200 command can be omitted, and the establishment of the Bluetooth connection between the TV 100 and the remote 200 can be interpreted as a call accept command instead.

The TV UI 118 outputs an "answer call" command to the client engine 114. In response to the "answer call" message, the client engine 114 establishes the call connection with the communication client 420 of the calling user 414.

When the user 402 talks into the microphone 302 (shown in FIG. 3), the audio signal is converted to digital data by the microphone circuitry and the Bluetooth transceiver 206 to transmit the audio signal to the Bluetooth transceiver 126 of the TV 100. The transmission of the audio can utilise a standard Bluetooth protocol for transmitting audio information.

Upon receiving the audio information at the Bluetooth transceiver 126, the TV UI 118 passes the audio information to the voice engine 116. The voice engine 116 encodes the audio information as VoIP packets and passes these to the client engine 114. The client engine 114 transmits the VoIP packets to the network 406 via the network interface 408, where they are routed to the communication client 420 running on the user terminal 416 of the second user 414. The client 420 decodes the VoIP packets to produce an audio signal that can be heard by the user 414 using the handset 422.

Conversely, when the second user 414 talks into handset 422, the client 420 executed on user terminal 416 encodes the audio signals into VoIP packets and transmits them across the network 406 to the TV 404. The VoIP packets are received at the client engine 114 and passed to the voice engine 116. The voice engine 116 decodes the VoIP packets to produce audio information.

In one embodiment, the audio information is passed from the voice engine 116 to the amplifier 110, such that the voice from the second user 414 is heard from the TV speakers 112. If the TV 100 is currently being used to watch a TV programme, then the audio from the TV programme can be deactivated. Alternatively, the audio from the call can be mixed with the TV programme audio, which can be decreased in volume. In an alternative embodiment, if the remote control unit 200 comprises the optional speaker circuitry, as described above with reference to FIG. 2, the audio information from the voice engine 116 can be passed to the Bluetooth transceiver 126 and transmitted to the remote control unit 200 and converted to audible signals by the speaker circuitry. The user can then hear the voice of the second user 414 from the speaker (304 in FIG. 3) in the remote control unit 200.

The remote control unit 200 can also be used for initiating a call to another party. For example, the first user 402 can use the remote control unit 200 to initiate a call to the second user 414. The TV UI 118 has a "call set up" state which can be entered by the user. The call set up state can be entered by the user selecting a calling functionality option using the remote, for example using a dedicated button on the remote or by navigating to an on-screen option using the directional pad (312 in FIG. 3). Alternatively, the call entry state can be entered by performing a physical action on the remote, such as sliding out a movable microphone. In response to this a command is sent to the TV 100 which causes the call entry state to be entered. Typically, the call entry state displays a UI to the user comprising the contact list and a contact name/phone number entry field.

The first user 402 can select the second user 414 from the contact list and initiate the call using the remote control unit. As described above for an incoming call, this may send an IR command to the TV 100, activate the Bluetooth transceiver 206 and activate the microphone circuitry. The TV UI 118 sends a message to the client engine 114 to initiate the call to the second user 414. This is performed in a similar manner to that described above for a call initiated from the second user 414 to the first user 402. The call can then proceed in the same manner as described previously.

The VoIP packets for calls between users (such as 402 and 414) as described above are passed across the network 406 only, and the public switched telephone network ("PSTN") (424) is not involved. Furthermore, in the preferred embodiment of a P2P system, the actual voice calls between users of the communication system can be made with no central servers being used. This has the advantages that the network scales easily and maintains a high voice quality, and the call can be made cost free to the users.

However, in addition, calls can also be made from the embedded communication client 410 using the packet-based communication system to fixed-line or mobile telephones (e.g. 426), by routing the call to the PSTN network 424. Similarly, calls from fixed-line or mobile telephones 426 can be made to the packet-based communication system via the PSTN 424.

In addition to making voice calls, the user 402 of the client 410 can also communicate with the users listed in the contact list in several other ways. For example, an instant message (also known as a chat message) can be sent to a contact. As with voice calls, the remote control unit 200 can be used for instant messaging. Text data can be input using the number keys, which are also used to enter alphabetic characters. The text data is transmitted to the TV 100 using the IR transmitter 204, as this is more power-efficient than Bluetooth and does not require a high data rate. Also, instead of sending data over IR, bluetooth can be used while the user is actively using the remote unit, as battery life concern is greatly reduced during short bursts of activity and bluetooth is a more reliable form of communication (it does not require line of sight). Full keyboard via Bluetooth or IR could also be provided, e.g. for IM chat usage.

The TV UI 118 has a "chat entry state" in which key presses from the remote control unit (received at the IR receiver 124) are interpreted as alphanumeric characters that are passed to the client engine 114. The chat entry state can be entered when a user responds to an incoming chat message, or when the user 402 selects a "chat" option displayed in the UI. The chat message data is encoded and sent from the client engine 114 over the network 406 to the communication client 420 of, for example, the second user 414. The message is displayed to the second user 414 on the user terminal 416. The second user 414 can respond by entering his own chat message, which is sent by the client 420 and received at the client engine 114. The client engine passes the message to the TV UI 118, which displays the message to the user 402 on the screen 102.

The above-described system therefore provides the ability to make and receive calls and IM message on a TV. In particular, calls and so forth can be received during a TV program. However, as mentioned, it would be desirable to prevent notifications of incoming calls, chat requests or other communication events from interfering with a user's viewing. Therefore according to an embodiment of the invention, the communication client 410 is programmed to detect the viewing activity of the user 402, i.e. to detect what the user 402 is watching if anything on the TV 404, and to control communication notifications in dependence on the detected viewing activity.

For example, the client 410 may detect that a user is watching their favourite TV show, or watching a DVD. For these "active" viewing activity states the notification may be controlled to occur at a lower level of interruption, for example the notification may be completely suppressed, or presented to the user using a different output device, or with a different transparency of the notification message (i.e. it becomes more "see through" on the screen).

The TV UI 118 provides a user interface for the client engine 114 of the client 410. The logic for controlling the level of interruption may be implemented by the TV UI 118 software.

Examples of reducing the level of interruption of a notification are as follows.

One possibility is to completely suppress (i.e. prevent) notification of the incoming communication event. In this case the user's presence may also be changed to 'do not disturb'.

Another possibility is to output the notification to a different output device. For example, the default setting may cause event notifications to be output to the LCD screen 102 of the TV 404, but if the user is in an active viewing state a notification may instead be output via the TV speaker 112, an LED located at the TV 404, an output device located at the remote control 200 or base station for the remote control.

Another possibility is to increase the transparency of a notification presented on the screen 102. As shown in FIG. 1, the TV comprises three frame buffers FB1, FB2 and FB3 that receive information to be displayed on the TV screen 102. FB1 receives data from the TV UI 118 and is used to present TV UI graphics such as incoming call notifications, volume indicator etc. FB2 receives transparency data from the TV UI 118 and is used to control the transparency of the graphics provided from F131. FB3 receives video.

Examples of different viewing activities which may trigger the change in notification are as follows.

One option is to use a different notification depending on whether the TV 404 is turned on or in use (an active viewing state) or whether it is off or not in use (an inactive viewing state), i.e. whether the user 402 is currently watching anything or not. "Off" or "inactive" in this case could include the TV 404 being in a standby state, or simply receiving no input. For example, audible and/or visible notifications could be suppressed when in an active viewing state, or switched to a less obtrusive notification type or style such as a quieter ring, a smaller or more transparent on-screen notification, or lighting or flashing an LED on the front of the TV; but when in an inactive viewing state on the other hand, a default notification could be used such as a louder ring or default size and transparency of on-screen message.

In a further embodiment of the invention, the user's viewing activity may be determined by detecting whether the user has selected an alternate source of video data such as from a DVD player or other video disc player. This could be achieved for example by monitoring an auxiliary video input to the TV 404, or detecting a selection of an auxiliary input from the remote control 200. If the video input is provided from an auxiliary input, the client 410 may detect an active viewing state and hence suppress or reduce the interruption level of notifications as discussed above, but if the user is watching neither TV nor video from an alternate source then the client 410 detects an inactive viewing state and uses the default notification.

In a particularly preferred embodiment, the user's viewing activity may be determined by polling an Electronic Program Guide (EPG). The EPG is an on-screen guide to scheduled broadcast TV programs, typically with functions allowing a viewer to navigate, select, and discover content by time, title, channel, etc. by using their remote control 200. By navigating through an EPG on a receiving device such as TV 404, users can see more information about the current program and about future programs. The EPG is preferably implemented in the same product as the client 410, e.g. in the TV 404 or STB, and may be populated with program schedule information based on a special data channel provided from the TV broadcaster.

Particularly, a user may navigate the EPG using the remote control 200 to flag channels and programs as favourites, and to select channels to view. According to a preferred embodiment, the communication client 410 is arranged to poll the EPG to determine if the channel or show that a user is currently viewing is set as a favourite. If it is determined that the user is currently viewing a favourite show or channel then the communication client 410 detects an "favourite" state of viewing activity and hence suppresses or reduce the interruption level of notifications as discussed above. But if the user is watching a channel or show not flagged in the EPG as a favourite then the client 410 detects a "non-favourite" state of viewing activity and so could use the default notification, or perhaps an intermediate reduction in the notification' interruption level between the "favourite" state notification level and the "inactive" state notification level.

Any of the above or other different changes in notification type or style may be used in conjunction with any of the above or other different changes in user viewing activity.

Further, upon detecting a particular change in viewing activity, the client 410 may also change the presence status of the user 402, e.g. by changing the presence to "do not disturb" when in an inactive viewing state or perhaps only when watching a "favourite".

As mentioned, the TV UI 118 provides user interface for the client engine 114 of the client 410, and the logic for controlling the level of interruption may be implemented by the TV UI 118 software. In an alternative embodiment of the invention the client 410 may be provided in a set top box together with a dedicated UI and the EPG, in which case the client 410 will poll the EPG and implement the notification logic.

The UI may write information directly into a frame buffer. If the user is watching TV via set-top box at a time, the set-top box can display the UI by writing into frame buffer of a set-top box. If user is watching DVD from DVD player then the set-top box input is ignored by TV, and nothing can be displayed.

Some high-end TV sets include HDMI inputs, and support various interconnect buses (multimedia extensions for UpnP even allow computer network devices talk to the TV and vice versa). These can also serve as notification channels that may allow switching of the TV input to set-top box, for example.

While this invention has been particularly shown and described with reference to preferred embodiments, it will be understood to those skilled in the art that various changes in form and detail may be made without departing from the scope of the invention as defined by the appended claims.

In certain embodiments of the present invention, said reception may comprise receiving a transport stream comprising packets of a plurality of time-division multiplexed broadcast signals corresponding to a plurality of respective concurrent programs, and the demultiplexing may comprise filtering the packets to extract the packets of the required program.

Said reception may comprise receiving frequency-division multiplexed broadcast signals, and the demultiplexing may comprise tuning a tuning circuit to the frequency of the required program.

Said processing may further comprise processing an alternative video signal from a source other than television broadcast, the selection of said viewing activity may comprise selecting between a received television signal and the alternative video signal for output to the television screen, and the control of said notifications may be performed in dependence on whether the alternative video signal is selected.

Said other source may be video disc player, and the control of said notifications may be performed in dependence on whether video disc is selected.

The selection of said viewing activity may comprise selecting between an active viewing state in which signals are output to the television screen and an inactive viewing state in which signals are not output to the television screen, and the control of said notifications may be performed in dependence on whether the active or inactive viewing state has been selected.

The method may comprise referring to an electronic program guide comprising a digital schedule of programs including a record of whether programs have been flagged by a user, wherein the control of said notifications may be performed in dependence on whether the selected program is flagged.

The control of said notifications may comprise suppressing notifications in dependence on the selected viewing activity.

The control of said notifications may comprise changing output device for the notification in dependence on the selected viewing activity.

The control of said notifications may comprise changing the appearance of visible notifications on said television screen in dependence on the selected viewing activity.

The change of appearance of said visible notifications may comprise altering their transparency.

Said reception may comprise receiving one of: a wireless broadcast from a satellite repeater station, a wireless broadcast from a terrestrial repeater station, and a cable broadcast.

The method may further comprise changing a presence status of the user in dependence on said selection of viewing activity.

The establishment of said bidirectional communications may comprise establishing at least one of a video call, an audio phone call, and a text chat conversation.

The establishment of said bidirectional communications via a packet-based communications network may comprise establishing the bidirectional communications via the Internet.

The establishment of said bidirectional communications may comprise establishing the bidirectional communications via a peer-to-peer connection in said communication network.

The invention claimed is:

1. A television receiver system comprising:
a television receiver configured to receive multiplexed broadcast television signals corresponding to a plurality of respective concurrent programs;
signal processing apparatus, coupled to the television receiver, configured to process signals including at least said received television signals for output to a television screen, the signal processing apparatus comprising a demultiplexer configured to separate out the signal of a selected one of the programs for output to the television screen;
a control device communicable with the signal processing apparatus, configured to enable a user to select a viewing activity by controlling the output to the television screen, the control device being configured to enable the user to select said viewing activity by selecting the selected program for output to the television screen;
a memory storing a communication client application;
a communications processing apparatus, coupled to said memory, configured to execute the communication client application;
the client application configured to enable the user to establish bidirectional communications with one or more other users via a packet-based communication network, and to provide notifications to the user of incoming communication events from other users;
the client application further configured to control said notifications of incoming communication events based on the selected program; and
the signal processing apparatus configured to process an alternative video signal from a source other than television broadcast, the control device configured to enable the user to select said viewing activity by selecting between a received television signal and the alternative video signal for output to the television screen, and the client application configured to is detect whether the alternative video signal is selected for output to the television screen and control said notifications by suppressing or reducing an interruption level of said notifications if the alternative video signal is selected.

2. The system of claim 1, wherein the television receiver is configured to receive a transport stream comprising packets of a plurality of time-division multiplexed broadcast signals corresponding to a plurality of respective concurrent programs, and wherein the demultiplexer comprises a packet filter configured to extract the packets of the selected program.

3. The system of claim 1, wherein the television receiver is configured to receive frequency-division multiplexed broadcast signals, and wherein the demultiplexer comprises a tuner circuit configured to tune to the frequency of the selected program.

4. The system of claim 1, wherein said source other than television broadcast is one of a gaming console, a DVD player, or a video disc player, wherein the control device is configured to enable the user to select said viewing activity by selecting between television and said source other than television broadcast, and wherein the client application is configured to control said notifications in dependence on whether the gaming console, the video DVD player, or the video disc player is selected.

5. The system of claim 1, wherein:
the control device is configured to enable the user to select said viewing activity by selecting between an active viewing state in which signals are output to the television screen and an inactive viewing state in which signals are not output to the television screen, and
the client application is further configured to control notifications in dependence on whether the active or inactive viewing state has been selected.

6. The system of claim 1, wherein the client application is further configured to control the notifications by suppressing notifications in dependence on the selected viewing activity.

7. The system of claim 1, wherein the client application is further configured to control the notifications by changing an output device for the notifications based on the selected viewing activity.

8. The system of claim 1, wherein the client application is further configured to control the notifications by changing an appearance of visible notifications on said television screen in based on the selected viewing activity.

9. The system of claim 8, wherein the client application is further configured to change the appearance of said visible notifications by altering a transparency of said visible notifications.

10. The system of claim 1, wherein the television receiver comprises one of a satellite television receiver configured to receive wireless broadcasts from a satellite repeater station, a terrestrial television receiver configured to receive wireless broadcasts from a terrestrial repeater station, or a cable television receiver configured to receive cable broadcasts.

11. The system of claim 1, wherein the client application is further configured to change a presence status of the user based on said selection of viewing activity.

12. The system of 1, wherein the bidirectional communication comprises at least one of a video call, an audio phone call, and or a text chat conversation.

13. The system of claim 1, wherein said communication network comprises the Internet.

14. The system of claim 1, wherein the client application is programmed to enable the user to establish said bidirectional communications via a peer-to-peer connection in said communication network.

15. The system of claim 1, wherein the system comprises one of a television set or a set-top box.

16. The system of claim 1, wherein the client application is further configured to refer to an electronic program guide comprising a digital schedule of programs including a record of whether programs have been flagged by the user, and to control said notifications based on whether the selected program is flagged.

17. A method comprising:
receiving multiplexed broadcast television signals corresponding to a plurality of respective concurrent programs;
processing said received television signals for output to a television screen, said processing comprising demultiplexing the received signals to separate out the signal of a selected one of the programs for output to the television screen;
selecting a viewing activity by controlling the output to the television screen, the selection of said viewing activity comprising selecting the selected program for output to the television screen;
executing a communication client application to establish bidirectional communications with one or more other users via a packet-based communication network, to provide notifications to the user of incoming communication events from other users, and to refer to an electronic program guide comprising a digital schedule of programs including a record of whether programs have been flagged by a user;

controlling said notifications of incoming communication events based on said selection of viewing activity;

processing an alternative video signal from a source other than television broadcast;

permitting selection of said viewing activity by permitting selection between a received television signal and the alternative video signal for output to the television screen;

detecting whether the alternative video signal is selected for output to the television screen; and controlling said notifications by suppressing or reducing an interruption level of said notifications if the alternative video signal is selected.

18. A television set comprising:

a television receiver configured to receive multiplexed broadcast television signals corresponding to a plurality of respective concurrent programs;

a television screen;

signal processing apparatus, coupled to the television receiver and screen, configured to process signals including at least said received television signals for output to the television screen, the signal processing apparatus comprising a demultiplexer configured to separate out the signal of a selected one of the programs for output to the television screen;

a control device communicable with the signal processing apparatus, configured to enable a user to select a viewing activity by controlling the output to the television screen, the control device configured to enable the user to select said viewing activity by selecting the selected program for output to the television screen;

a memory storing a communication client application;

a communications processing apparatus, coupled to said memory, configured to execute the communication client application;

the client application configured to enable the user to establish bidirectional communications with one or more other users via a packet-based communication network, and to provide notifications to the user of incoming communication events from other users;

the client application further configured to control said notifications of incoming communication events based on the selected program; and the signal processing apparatus configured to process an alternative video signal from a source other than television broadcast, the control device configured to enable the user to select said viewing activity by selecting between a received television signal and the alternative video signal for output to the television screen, and the client application configured to detect whether the alternative video signal is selected for output to the television screen and control said notifications by suppressing or reducing an interruption level of said notifications if the alternative video signal is selected.

19. A set-top box for connection to a television set, the set-top box comprising:

a television receiver configured to receive multiplexed broadcast television signals corresponding to a plurality of respective concurrent programs;

signal processing apparatus, coupled to the television receiver, configured to process signals including at least said received television signals for output to a television screen, the signal processing apparatus comprising a demultiplexer configured to separate out the signal of a selected one of the programs for output to the television screen;

a control device communicable with the signal processing apparatus, configured to enable a user to select a viewing activity by controlling the output to the television screen, the control device configured to enable the user to select said viewing activity by selecting the selected program for output to the television screen;

a memory storing a communication client application;

a communications processing apparatus, coupled to said memory, configured to execute the communication client application;

the client application configured to enable the user to establish bidirectional communications with one or more other users via a packet-based communication network, and to provide notifications to the user of incoming communication events from other users;

the client application further configured to control said notifications of incoming communication events based on the selected program; and the signal processing apparatus configured to process an alternative video signal from a source other than television broadcast, the control device configured to enable the user to select said viewing activity by selecting between a received television signal and the alternative video signal for output to the television screen, and the client application configured to detect whether the alternative video signal is selected for output to the television screen and control said notifications by suppressing or reducing an interruption level of said notifications if the alternative video signal is selected.

20. A computer readable storage device storing a client application product for use in a television receiver system, the television receiver system configured to receive multiplexed broadcast television signals corresponding to a plurality of respective concurrent programs, and output a selected one of said programs to a screen, the client application product when executed on a processor of the television receiver system performs a method comprising:

establishing bidirectional communications with one or more other users via a packet-based communication network, to provide notifications to the user of incoming communication events from other users, and to refer to an electronic program guide comprising a digital schedule of programs including a record of whether programs have been flagged by the user;

controlling said notifications of incoming communication events based on said selection of viewing activity, the control of said notifications performed based on the selected program and based on whether the selected program is flagged; and the television receiver system configured to process an alternative video signal from a source other than television broadcast and to enable the user to select said viewing activity by selecting between a received television signal and the alternative video signal for output to the television screen, said code configured to detect whether the alternative video signal is selected for output to the television screen and control said notifications by suppressing or reducing an interruption level of said notifications if the alternative video signal is selected.

* * * * *